(12) United States Patent
Li et al.

(10) Patent No.: US 11,854,145 B2
(45) Date of Patent: Dec. 26, 2023

(54) OCTREE-BASED THREE-DIMENSIONAL BUILDING MODEL LOD METHOD

(71) Applicant: SPEED TECHNOLOGY CO., LTD., Jiangsu (CN)

(72) Inventors: Jun Li, Jiangsu (CN); Jianyong Fan, Jiangsu (CN); Biliang Zhu, Jiangsu (CN); Zhongjian Xu, Jiangsu (CN)

(73) Assignee: SPEED TECHNOLOGY CO., LTD., Jiangsu (CN)

( * ) Notice: Subject to any disclaimer, the term of this patent is extended or adjusted under 35 U.S.C. 154(b) by 45 days.

(21) Appl. No.: 17/914,767

(22) PCT Filed: Mar. 30, 2021

(86) PCT No.: PCT/CN2021/084080
§ 371 (c)(1),
(2) Date: Sep. 27, 2022

(87) PCT Pub. No.: WO2021/204025
PCT Pub. Date: Oct. 14, 2021

(65) Prior Publication Data
US 2023/0134338 A1 May 4, 2023

(30) Foreign Application Priority Data
Apr. 8, 2020 (CN) .......................... 202010267603.3

(51) Int. Cl.
*G06T 17/00* (2006.01)
*G06T 15/04* (2011.01)

(52) U.S. Cl.
CPC ............ *G06T 17/005* (2013.01); *G06T 15/04* (2013.01); *G06T 2210/04* (2013.01); *G06T 2210/36* (2013.01)

(58) Field of Classification Search
CPC ... G06T 17/005; G06T 15/04; G06T 2210/04; G06T 2210/36
See application file for complete search history.

(56) References Cited

U.S. PATENT DOCUMENTS 9,600,929 B1 * 3/2017 Young ..................... G06T 17/00
2002/0130857 A1 * 9/2002 Perry ...................... G06T 17/10
345/590

(Continued)

FOREIGN PATENT DOCUMENTS

CN 102360515 4/2013
CN 102663815 11/2014

(Continued)

OTHER PUBLICATIONS

Jiang Shaobo et al., "Multi-resolution Representation of 3D Complex Building Model with Features Preservation", Geomatics and Information Science of Wuhan University, Aug. 2012, submit with English abstract, pp. 1-5.

(Continued)

*Primary Examiner* — Daniel F Hajnik
(74) *Attorney, Agent, or Firm* — JCIPRNET

(57) ABSTRACT

The present invention provides an octree-based three-dimensional building model LOD method, specifically comprising the following steps: S1, reading three-dimensional building model data; S2, setting a tree depth Depth parameter of the octree; S3, respectively merging leaf node bounding boxes of the octree according to layers, and establishing coarse grid blocks; S4, merging the coarse grid blocks of the components of each layer; S5, performing triangularization; S6, calculating a normal vector of the coarse grid block; S7, merging the simplified components to form a building model of a coarse grid block; S8, deleting internal vertexes; S9, (Continued)

setting materials or textures; and S10, outputting the three-dimensional building LOD model.

6 Claims, 3 Drawing Sheets

(56) References Cited

U.S. PATENT DOCUMENTS

| | | | | |
|---|---|---|---|---|
| 2008/0238919 | A1* | 10/2008 | Pack | G06T 15/04 |
| | | | | 345/582 |
| 2020/0401436 | A1* | 12/2020 | Yerli | G06F 3/011 |

FOREIGN PATENT DOCUMENTS

| | | |
|---|---|---|
| CN | 108470374 | 8/2018 |
| CN | 109118588 | 1/2019 |
| CN | 109345628 | 2/2019 |
| CN | 111161411 | 5/2020 |
| KR | 101897760 | 9/2018 |

OTHER PUBLICATIONS

"International Search Report (Form PCT/ISA/210) of PCT/CN2021/084080," dated Jul. 2, 2021, with English translation thereof, pp. 1-4.

"Written Opinion of the International Searching Authority (Form PCT/ISA/237) of PCT/CN2021/084080," dated Jul. 2, 2021, pp. 1-5.

* cited by examiner

OCTREE-BASED THREE-DIMENSIONAL BUILDING MODEL LOD METHOD

CROSS-REFERENCE TO RELATED APPLICATION

This application is a 371 of international application of PCT application serial no. PCT/CN2021/084080, filed on Mar. 30, 2021, which claims the priority benefit of China application no. 202010267603.3, filed on Apr. 8, 2020. The entirety of each of the above mentioned patent applications is hereby incorporated by reference herein and made a part of this specification.

TECHNICAL FIELD

The present invention relates to the technical field of three-dimensional building model processing, and in particular to an octree-based three-dimensional building model LOD method.

DESCRIPTION OF RELATED ART

With the concept of "smart city" put forward, it is a general trend to apply massive three-dimensional building data to urban geographic information management. Compared with other types of urban data, the three-dimensional building model has a higher data volume and more complex geometric structural characteristics. On the one hand, the high data volume is not conducive to data transmission and real-time rendering. On the other hand, complex structural characteristics contain some details, and after the model reaches a certain level, some details will be difficult to be perceived by users. The core of the octree-based three-dimensional building model LOD method is to solve the above two problems. The key is to simplify the model to reduce the complexity of the model and reduce the data volume of the model.

In recent years, on the basis of the above technical research, domestic and foreign scholars began to study the simplification and multi-level detail layering technology of the three-dimensional building model, and proposed the LOD construction method of a building model. For example, Chinese patent document 201110317931.0 proposed a progressive grid data organization method for a three-dimensional model, wherein progressive grid data are generated according to an original grid of the three-dimensional model and are layered and organized in a multi-dimension manner, to realize non-redundancy multi-dimension incremental type data organization of the three-dimensional model, which is favorable for quick transmission and high-efficiency visualization of complicated three-dimensional models. Chinese patent document CN201210090628.6 solves the problem that the existing building model construction method based on two-dimensional images is not detailed enough in the top surface structure, resulting in low construction accuracy; Chinese patent document CN201810893994.2 deletes non-critical information irrelevant to the model structure from the obtained parametric three-dimensional model; the parametric three-dimensional model with the non-critical information deleted is polygonized to obtain a grid model; the grid model is encoded and compressed on the basis of the lossless compression coding algorithm to obtain a lightweight model. This method does not involve LOD. CityGML standard proposed by OGC divides the three-dimensional building model into five levels, but it does not provide methods and tools for constructing LOD, resulting in the existence of standards and the absence of tools that meet this standard, thereby unsatisfactory implementation of the standard.

Therefore, it is necessary to develop a method for constructing a three-dimensional building LOD model, which is not limited by building complexity and has high robustness; the generated LOD model can well keep the main structural characteristics of an original building model and has high similarity; the structural characteristics of the LOD model can be well kept even when the resolution is low.

BRIEF SUMMARY OF THE INVENTION

The technical problem to be solved by the present invention is to provide an octree-based three-dimensional building model LOD method, which utilizes the merging and splitting of octree leaf nodes. First, the three-dimensional building model can be simplified to reduce the data volume of the low-level model; second, the generated LOD model can better keep the main structural characteristics of the original building model, and keep the similarity with the original model, so as to improve the recognition.

To solve the above technical problem, the technical solution adopted by the present invention is: an octree-based three-dimensional building model LOD method, specifically comprising the following steps:
   S1, reading three-dimensional building model data, and taking the source model as the most advanced model;
   S2, setting a tree depth Depth parameter of the octree, and constructing a sparse octree with a depth of Depth for the components of the building model;
   S3, respectively establishing coarse grid blocks for each component by level, the coarse grid block being the outer bounding box of the octree leaf node;
   S4, merging the coarse grid blocks of each level to form the components of the building model; setting the minimum neighboring threshold of the bounding box of the leaf node forming the building components, merging the bounding boxes of all leaf nodes according to the Z-axis, X-axis and Y-axis, and forming the coarse grid block of the building component at the current level;
   S5, triangularization, i.e., performing triangularization on six faces of each grid block of the coarse grid block generated in step S4, by sequentially dividing each face of the grid cube into two triangular faces in a clockwise direction according to the left-hand coordinate system;
   S6, calculating a normal vector of the coarse grid block: calculating a vertex normal vector of each grid block of the coarse grid block generated in step S5; the value of normal vector is one of top, down, front, rear, left and right;
   S7, merging the simplified components to form a building model of a coarse grid block: setting the minimum neighboring threshold of each building component, merging the building components according to the Z-axis, X-axis and Y-axis for the coarse grid block of step S6, and taking the merging result as the coarse grid block of the building model at the current level;
   S8, deleting internal vertexes: deleting internal points of the coarse grid block in step S7, retaining the surface vertexes of the three-dimensional building model, and deleting internal vertexes by using QEM (Quadric Error Mactrics) model simplification algorithm;
   S9, setting materials or textures: if the original building model has no textures or materials, using the default material instead; otherwise, the textures and materials of the whole building are calculated, and the whole textures and materials are spliced into a texture; and S10, outputting the three-dimensional building LOD mode to facilitate visualization by other software.

By adopting the above technical solution, the LOD of the three-dimensional building model can be constructed with the sparse octree model, which can ensure the details of the building model at a high level, such as the original model is the most advanced model; according to the set depth of the octree, the hierarchical tree of LOD can be controlled to achieve the maximized simplified model at the lowest level; each component forming the model is divided into sparse octrees, which can ensure the similarity of the complex building model as much as possible and enhance the recognition of the coarse model; for the internal point deletion of the merged model, the vertices inside the model can be deleted, reducing the data volume of the model, and improving the rendering efficiency, transmission and IO efficiency of the data; merging three-dimensional model textures into a texture cannot only reduce the data volume of the model, but also improve the rendering efficiency.

The three-dimensional building model LOD method based on the octree of the present invention is not limited by complexity and has high robustness, the generated LOD model can well keep main structural characteristics of an original building model and has high similarity, and the structural characteristics of the LOD model can be well kept even when the resolution ratio is low.

As the preferred technical solution of the present invention, step S4 is to sequentially merge the bounding boxes of all leaf nodes at a certain threshold according to Z-axis, X-axis and Y-axis, so as to form a coarse grid block of a component at the current level; merging according to Z-axis, circularly taking two adjacent grid blocks, calculating the difference between the maximum of the lower grid block Z and the minimum of the upper grid block Z, if the difference is less than the set threshold, assigning the maximum of the upper grid block Z to the maximum of the lower grid block Z, and deleting the upper grid block until the differences of all grid blocks Z are all greater than the set threshold; merging according to the X-axis, circularly taking two adjacent grid blocks, calculating the difference between the maximum of the front grid block X and the minimum of the rear grid block X, if the difference is less than the set threshold, assigning the maximum of the rear grid block X to the maximum of the front grid block X, and deleting the rear grid block until the differences of all grid blocks X are all greater than the set threshold; and merging according to the Y-axis, circularly taking two adjacent grid blocks, calculating the difference between the maximum of the left grid block Y and the minimum of the right grid block Y, if the difference is less than the set threshold, assigning the maximum of the right grid block Y to the maximum of the left grid block Y, and deleting the right grid block until the differences of all grid blocks Y are all greater than the set threshold;

As the preferred technical solution of the present invention, in step S6 of calculating a normal vector of the coarse grid block, the values of the normal vector are top, down, front, rear, left and right, corresponding to:

(0.0f, 0.0f, 1.00, (0.0f, 0,0f, −1.00, (0.0f, 1.0f, 0.00, (0.0f, −1.0f, 0.00, (1.0f, 0.0f, 0.00, (−1.0f, 0.0f, 0.00.

As the preferred technical solution of the present invention, in step S8 of deleting the internal vertexes, during the deletion of internal vertexes, attention shall be paid to that adjacent vertexes can be regarded as internal vertexes, and the deletion algorithm can be classic point deletion algorithm. The present invention adopts the existing QEM (Quadric Error Mactrics) model simplification algorithm.

As the preferred technical solution of the present invention, in step S9 of setting materials or textures, the textures of the building model contain top, bottom, front, rear, left and right, and all textures need to be spliced into a texture; the bottom color value of the whole texture is (188.0f/255.0f,188.0f/255.0f,222.0f/255.0f); a viewport coordinate system is set, and the origin of the coordinate system is located at the lower left corner of the screen, with the positive direction of the X-axis to the right, the positive direction of the Y-axis upwards, and the Z-axis vertical to the rear of the screen; the transformation matrices of the top, bottom, front, rear, left and right of the corresponding building model are calculated respectively, and all faces of the building model are projected on the same plane; the row and column values corresponding to each face are (0, 0), (0, 1), (1, 0), (1, 1), (2, 0), (2, 1).

As the preferred technical solution of the present invention, in step S9 of calculating texture coordinates, the texture coordinates of the surface vertices of the three-dimensional building model in step S8 are calculated, and the TOP calculation method is given below:

$$s=(0.5-(C_x-V_x)/L_{max})/3.0 \quad t=(0.5-(C_y-V_y)/L_{max})/3.0+2.0/3.0;$$

the BOTTOM calculation method of BOTTOM is given below:

$$s=(0.5-(C_x-V_x)/L_{max})/3.0 \quad t=(0.5-(C_y-V_y)/L_{max})/3.0+1.0/3.0;$$

the FRONT calculation method of BOTTOM is given below:

$$s=(0.5-(C_x-V_x)/L_{max})/3.0+1.0/3.0 \quad t=(0.5-(C_y-V_y)/L_{max})/3.0+2.0/3.0;$$

the REAR calculation method of BOTTOM is given below:

$$s=(0.5-(C_x-V_x)/L_{max})/3.0+1.0/3.0 \quad t=(0.5-(C_y-V_y)/L_{max})/3.0+1.0/3.0;$$

the LEFT calculation method of BOTTOM is given below:

$$s=(0.5+(C_x-V_x)/L_{max})/3.0+2.0/3.0 \quad t=(0.5-(C_y-V_y)/L_{max})/3.0+2.0/3.0;$$

the RIGHT calculation method of BOTTOM is given below:

$$s=(0.5-(C_x-V_x)/L_{max})/3.0+2.0/3.0 \quad t=(0.5-(C_y-V_y)/L_{max})/3.0+1.0/3.0;$$

where $L_{max}$: the maximum side length of the whole model, $C_x$, $C_y$: x, y coordinates of the center point of the whole model, $V_x$: x coordinate of the vertex, $V_y$: y coordinate of the vertex, (s, t): the texture coordinate of the vertex.

Compared with the prior art, the octree-based three-dimensional building model LOD method has the following advantages: the model is divided by sparse octrees, and then the LOD of the building is constructed by merging and simplifying. Compared with the traditional three-dimensional model simplification method, it can comprehensively consider the geometric and texture characteristics of the model, and can better keep the original appearance characteristics of the model while simplifying the model with a high data volume.

DETAILED DESCRIPTION OF THE INVENTION

The technical solutions in the embodiments of the present invention will be clearly and completely described below in conjunction with the drawings in the embodiments of the present invention.

Figure 1:
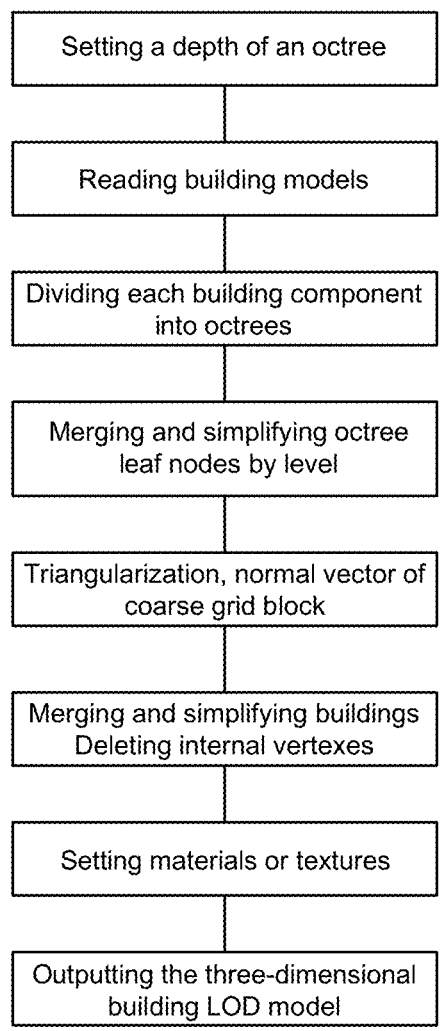
FIG. 1 is a work flow diagram of the octree-based three-dimensional building model LOD method according to the present invention.
Figure 2:
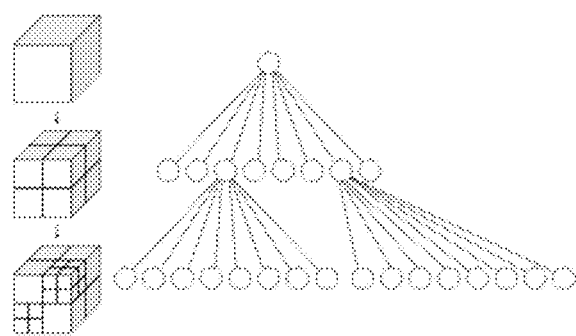
FIG. 2 is an octree model of the octree-based three-dimensional building model LOD method according to the present invention.
Figure 3:
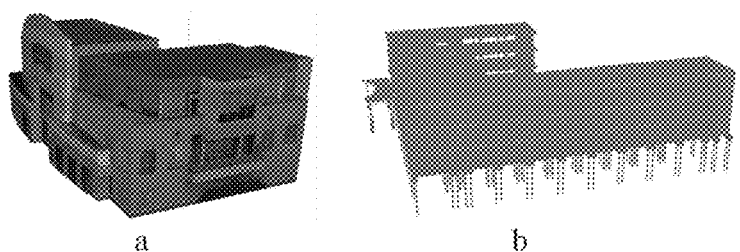
FIG. 3 is an original building model of the octree-based three-dimensional building model LOD method according to the present invention; where: Fig. a is the original model in obj format, and Fig. b is the original model in IFC format.

Embodiment: as shown in FIGS. 1-3, for the octree-based three-dimensional building model LOD method, constructing models LOD in obj, IFC formats specifically comprises the following steps:

S1, reading three-dimensional building model data, and taking the source model as the most advanced model;

S2, setting a tree depth Depth parameter of the octree, 5 layers set in the embodiment; dividing the building component into octrees, and constructing a sparse octree with a depth of Depth;

S3, respectively establishing coarse grid blocks for each component by level, the coarse grid block being the outer bounding box of the octree leaf node;

S4, merging the coarse grid blocks of each level to form the components of the building model; setting the minimum neighboring threshold of the bounding box of the leaf node forming the building components, merging the bounding boxes of all leaf nodes according to the Z-axis, X-axis and Y-axis, and forming the coarse grid block of the building component at the current level;

sequentially merge the bounding boxes of all leaf nodes at a certain threshold according to Z-axis, X-axis and Y-axis; merging according to Z-axis, circularly taking two adjacent grid blocks, calculating the difference between the maximum of the lower grid block Z and the minimum of the upper grid block Z, if the difference is less than the set threshold, assigning the maximum of the upper grid block Z to the maximum of the lower grid block Z, and deleting the upper grid block until the differences of all grid blocks Z are all greater than the set threshold; merging according to the X-axis, circularly taking two adjacent grid blocks, calculating the difference between the maximum of the front grid block X and the minimum of the rear grid block X, if the difference is less than the set threshold, assigning the maximum of the rear grid block X to the maximum of the front grid block X, and deleting the rear grid block until the differences of all grid blocks X are all greater than the set threshold; and merging according to the Y-axis, circularly taking two adjacent grid blocks, calculating the difference between the maximum of the left grid block Y and the minimum of the right grid block Y, if the difference is less than the set threshold, assigning the maximum of the right grid block Y to the maximum of the left grid block Y, and deleting the right grid block until the differences of all grid blocks Y are all greater than the set threshold;

S5, triangularization, i.e., performing triangularization on six faces of each grid block of the coarse grid block generated in step S4, by sequentially dividing each face of the grid cube into two triangular faces in a clockwise direction according to the left-hand coordinate system;

S6, calculating a normal vector of the coarse grid block: calculating a vertex normal vector of each grid block of the coarse grid block generated in step S5; the value of normal vector is one of top, down, front, rear, left and right;

the values of the normal vector are top, down, front, rear, left and right, corresponding to: (0.0f, 0.0f, 1.0f), (0.0f, 0,0f, −1.0f), (0.0f, 1.0f, 0.0f), (0.0f, −1.0f, 0.0f), (1.0f, 0.0f, 0.0f), (−1.0f, 0.00;

S7, merging the simplified components to form a building model of a coarse grid block: setting the minimum neighboring threshold of each building component, merging the building components according to the Z-axis, X-axis and Y-axis for the coarse grid block of step S6, and taking the merging result as the coarse grid block of the building model at the current level;

S8, deleting internal vertexes: deleting internal points of the coarse grid block in step S7, and retaining the surface vertexes of the three-dimensional building model;

the deletion algorithm can be classic point deletion algorithm, and the present embodiment adopts the existing QEM (Quadric Error Mactrics) model simplification algorithm; and S9, setting materials or textures: if the original building model has no textures or materials, using the default material instead; otherwise, the textures and materials of the whole building are calculated, and the whole textures and materials are spliced into a texture, to reduce the storage space; textures contain top, bottom, front, rear, left and right, and all textures are spliced to a texture; the bottom color value of the whole texture is (188.0f/255.0f, 188.0f/255.0f, 222.0f/255.0f); a viewport coordinate system is set, and the origin of the coordinate system is located at the lower left corner of the screen, with the positive direction of the X-axis to the right, the positive direction of the Y-axis upwards, and the Z-axis vertical to the rear of the screen; the transformation matrices of the top, bottom, front, rear, left and right of the corresponding building model are calculated respectively, and all faces of the building model are projected on the same plane; the row and column values corresponding to each face are (0, 0), (0, 1), (1, 0), (1, 1), (2, 0), (2, 1).

Figure 6:
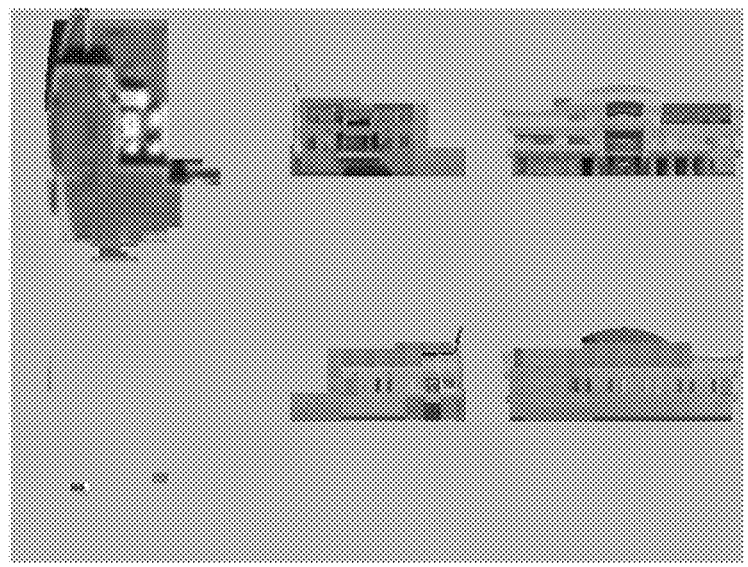
FIG. 6 is a texture arrangement diagram of the octree-based three-dimensional building model LOD method according to the present invention.

Next, texture coordinates of the model grid block vertex are calculated; the texture coordinates of the surface vertices of the three-dimensional building model in step S8 are calculated, and the TOP calculation method is given below:

$$s=(0.5-(C_x-V_x)/L_{max})/3.0 \quad t=(0.5-(C_y-V_y)/L_{max})/3.0+2.0/3.0;$$

the BOTTOM calculation method of BOTTOM is given below:

$$s=(0.5-(C_x-V_x)/L_{max})/3.0 \quad t=(0.5-(C_y-V_y)/L_{max})/3.0+1.0/3.0;$$

the FRONT calculation method of BOTTOM is given below:

$$s=(0.5-(C_x-V_x)/L_{max})/3.0+1.0/3.0 \quad t=(0.5-(C_y-V_y)/L_{max})/3.0+2.0/3.0;$$

the REAR calculation method of BOTTOM is given below:

$$s=(0.5-(C_x-V_x)/L_{max})/3.0+1.0/3.0 \quad t=(0.5-(C_y-V_y)/L_{max})/3.0+1.0/3.0;$$

the LEFT calculation method of BOTTOM is given below:

$$s=(0.5+(C_x-V_x)/L_{max})/3.0+2.0/3.0 \quad t=(0.5-(C_y-V_y)/L_{max})/3.0+2.0/3.0;$$

the RIGHT calculation method of BOTTOM is given below:

$$s=(0.5-(C_x-V_x)/L_{max})/3.0+2.0/3.0 \quad t=(0.5-(C_y-V_y)/L_{max})/3.0+1.0/3.0;$$

where $L_{max}$: the maximum side length of the whole model, $C_x$, $C_y$: x, y coordinates of the center point of the whole model, $V_x$: x coordinate of the vertex, $V_y$: y coordinate of the vertex, (s, t): the texture coordinate of the vertex. FIG. 6 shows the actual effect after setting materials or textures.

Figure 4:
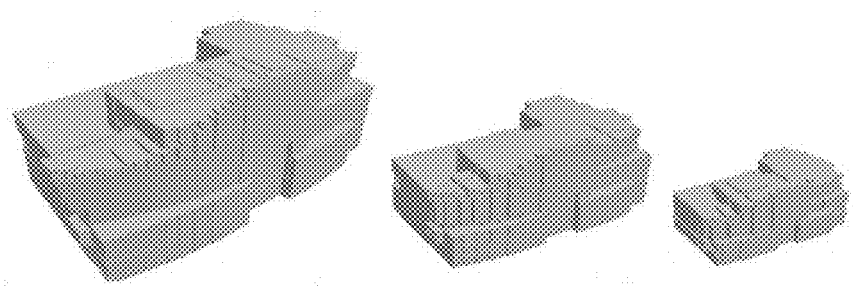
FIG. 4 is a multi-level model of the octree-based three-dimensional building model LOD method in obj format according to the present invention.
Figure 5:
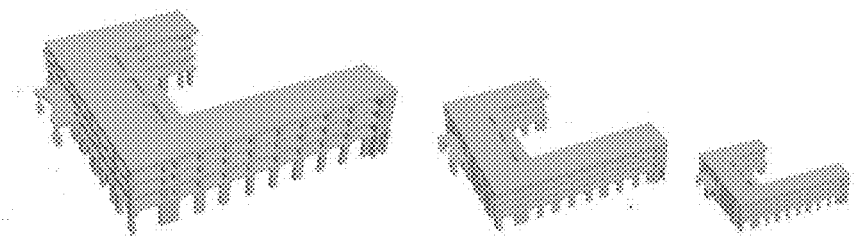
FIG. 5 is a multi-level model of the octree-based three-dimensional building model LOD method in IFC format according to the present invention.

Step S10, outputting a three-dimensional building LOD model, to facilitate visualization by other software, with the visualization effects as shown in FIGS. 4, 5.

The foregoing are only better embodiments of the present invention and are not intended to limit the present invention. Any modification, equivalent replacement, improvement, etc. made within the spirit and principles of the present invention shall be covered within the scope of protection for the present invention.

The invention claimed is:

1. An octree-based three-dimensional building model LOD method, specifically comprising the following steps:
   S1, reading three-dimensional building model data, and taking the source model as the most advanced model;
   S2, setting a tree depth Depth parameter of the octree, and constructing a sparse octree with a depth of Depth for the components of the building model;
   S3, respectively establishing coarse grid blocks for each component by level, the coarse grid block being the outer bounding box of the octree leaf node;
   S4, merging the coarse grid blocks of each level to form the components of the building model; setting the minimum neighboring threshold of the bounding box of the leaf node forming the building components, merging the bounding boxes of all leaf nodes according to the Z-axis, X-axis and Y-axis, and forming the coarse grid block of the building component at the current level;
   S5, triangularization, i.e., performing triangularization on six faces of each grid block of the coarse grid block generated in step S4, by sequentially dividing each face of the grid cube into two triangular faces in a clockwise direction according to the left-hand coordinate system;
   S6, calculating a normal vector of the coarse grid block: calculating a vertex normal vector of each grid block of the coarse grid block generated in step S5; the value of normal vector is one of top, down, front, rear, left and right;
   S7, merging the simplified components to form a building model of a coarse grid block: setting the minimum neighboring threshold of each building component, merging the building components according to the Z-axis, X-axis and Y-axis for the coarse grid block of step S6, and taking the merging result as the coarse grid block of the building model at the current level;
   S8, deleting internal vertexes: deleting internal points of the coarse grid block in step S7, retaining the surface vertexes of the three-dimensional building model, and deleting internal vertexes by using QEM model simplification algorithm;
   S9, setting materials or textures: if the original building model has no textures or materials, using the default material instead; otherwise, the textures and materials of the whole building are calculated, and the whole textures and materials are spliced into a texture; and
   S10, outputting the three-dimensional building LOD model.

2. The octree-based three-dimensional building model LOD method according to claim 1, wherein step S4 is to sequentially merge the bounding boxes of all leaf nodes at a certain threshold according to Z-axis, X-axis and Y-axis, so as to form a coarse grid block of a component at the current level; merging according to Z-axis, circularly taking two adjacent grid blocks, calculating the difference between the maximum of the lower grid block Z and the minimum of the upper grid block Z, if the difference is less than the set threshold, assigning the maximum of the upper grid block Z to the maximum of the lower grid block Z, and deleting the upper grid block until the differences of all grid blocks Z are all greater than the set threshold; merging according to the X-axis, circularly taking two adjacent grid blocks, calculating the difference between the maximum of the front grid block X and the minimum of the rear grid block X, if the difference is less than the set threshold, assigning the maximum of the rear grid block X to the maximum of the front grid block X, and deleting the rear grid block until the differences of all grid blocks X are all greater than the set threshold; and merging according to the Y-axis, circularly taking two adjacent grid blocks, calculating the difference between the maximum of the left grid block Y and the minimum of the right grid block Y, if the difference is less than the set threshold, assigning the maximum of the right grid block Y to the maximum of the left grid block Y, and deleting the right grid block until the differences of all grid blocks Y are all greater than the set threshold.

3. The octree-based three-dimensional building model LOD method according to claim 1, wherein in step S6 of calculating a normal vector of the coarse grid block, the values of the normal vector are top, down, front, rear, left and right, corresponding to:
   (0.0f, 0.0f, 1.0f), (0.0f, 0.0f, −1.0f), (0.0f, 1.0f, 0.0f), (0.0f, −1.0f, 0.0f), (1.0f, 0.0f, (−1.0f, 0.0f, 0.0f).

4. The octree-based three-dimensional building model LOD method according to claim 1, wherein in step S8, the adjacent vertexes are first set as internal vertexes, and the internal vertex deletion algorithm is the QEM model simplification algorithm.

5. The octree-based three-dimensional building model LOD method according to claim 1, wherein in step S9 of setting materials or textures, the textures of the building model contain top, bottom, front, rear, left and right, and all textures need to be spliced into a texture; the bottom color value of the whole texture is (188.0f/255.0f, 188.0f/255.0f, 222.0f/255.0f); a viewport coordinate system is set, and the origin of the coordinate system is located at the lower left corner of the screen, with the positive direction of the X-axis to the right, and the positive direction of the Y-axis upwards; the camera position is calculated; the transformation matrices of the top, bottom, front, rear, left and right of the corresponding building model are calculated respectively, and all faces of the building model are projected on the same plane; the row and column values corresponding to each face are (0, 0), (0, 1), (1, 0), (1, 1), (2, 0), (2, 1).

6. The octree-based three-dimensional building model LOD method according to claim 5, wherein in step S9 of calculating texture coordinates, the texture coordinates of the surface vertices of the three-dimensional building model in step S8 are calculated, and the TOP calculation method is given below:

$$s=(0.5-(C_x-V_x)/L_{max})/3.0 \quad t=(0.5-(C_y-V_y)/L_{max})/3.0+2.0/3.0;$$

the BOTTOM calculation method of BOTTOM is given below:

$$s=(0.5-(C_x-V_x)/L_{max})/3.0 \quad t=(0.5-(C_y-V_y)/L_{max})/3.0+1.0/3.0;$$

the FRONT calculation method of BOTTOM is given below:

$$s=(0.5-(C_x-V_x)/L_{max})/3.0+1.0/3.0 \quad t=(0.5-(C_y-V_y)/L_{max})/3.0+2.0/3.0;$$

the REAR calculation method of BOTTOM is given below:

$$s=(0.5-(C_x-V_x)/L_{max})/3.0+1.0/3.0 \quad t=(0.5-(C_y-V_y)/L_{max})/3.0+1.0/3.0;$$

the LEFT calculation method of BOTTOM is given below:

$$s=(0.5+(C_x-V_x)/L_{max})/3.0+2.0/3.0 \quad t=(0.5-(C_y-V_y)/L_{max})/3.0+2.0/3.0;$$

the RIGHT calculation method of BOTTOM is given below:

$$s=(0.5-(C_x-V_x)/L_{max})/3.0+2.0/3.0 \quad t=(0.5-(C_y-V_y)/L_{max})/3.0+1.0/3.0;$$

where $L_{max}$: the maximum side length of the whole model, $C_x$, $C_y$: x, y coordinates of the center point of the whole model, $V_x$: x coordinate of the vertex, $V_y$: y coordinate of the vertex, (s, t): the texture coordinate of the vertex.

* * * * *